US012461370B2

United States Patent
Huang et al.

(10) Patent No.: US 12,461,370 B2
(45) Date of Patent: Nov. 4, 2025

(54) LIGHTGUIDE WITH RADIAL PUPIL REPLICATION AND VISUAL DISPLAY BASED THEREON

(71) Applicant: Meta Platforms Technologies, LLC, Menlo Park, CA (US)

(72) Inventors: Ningfeng Huang, Redmond, WA (US); Alexander Koshelev, Redmond, WA (US); Giuseppe Calafiore, Redmond, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 827 days.

(21) Appl. No.: 17/556,888

(22) Filed: Dec. 20, 2021

(65) Prior Publication Data

US 2023/0085138 A1   Mar. 16, 2023

Related U.S. Application Data

(60) Provisional application No. 63/242,740, filed on Sep. 10, 2021.

(51) Int. Cl.
 *G02B 27/01* (2006.01)

(52) U.S. Cl.
 CPC .. *G02B 27/0172* (2013.01); *G02B 2027/0178* (2013.01)

(58) Field of Classification Search
 CPC ............... G02B 27/0172; G02B 2027/0178
 USPC ......................................................... 359/13
 See application file for complete search history.

(56) References Cited

U.S. PATENT DOCUMENTS

| | | |
|---|---|---|
| 6,580,529 B1 | 6/2003 | Amitai et al. |
| 2010/0284085 A1 | 11/2010 | Laakkonen |
| 2014/0104665 A1* | 4/2014 | Popovich ............. G02B 6/0076 359/15 |
| 2017/0315346 A1 | 11/2017 | Tervo et al. |
| 2019/0094551 A1 | 3/2019 | Yaras et al. |

FOREIGN PATENT DOCUMENTS

| | | |
|---|---|---|
| WO | 2015091277 A1 | 6/2015 |
| WO | 2020185954 A1 | 9/2020 |

OTHER PUBLICATIONS

International Preliminary Report on Patentability for International Application No. PCT/US2022/042992, mailed Mar. 21, 2024, 7 pages.
International Search report and Written Opinion for International Application No. PCT/US2022/042992, mailed Dec. 21, 2022, 9 pages.

* cited by examiner

*Primary Examiner* — Bumsuk Won
*Assistant Examiner* — Mitchell T Oestreich
(74) *Attorney, Agent, or Firm* — Greenberg Traurig, LLP

(57) ABSTRACT

A pupil-replicating waveguide usable in a VR display may have a slab of transparent material, an input grating coupler supported by the slab at the center of the slab, with output gratings supported by the slab and surrounding the input grating coupler. The input grating coupler couples image light into the slab, which propagates in the slab by total internal reflections. The out-coupling grating or gratings spread the image light all around the input grating, providing a wide beam of image light illuminating the eyebox of the VR display.

20 Claims, 8 Drawing Sheets

LIGHTGUIDE WITH RADIAL PUPIL REPLICATION AND VISUAL DISPLAY BASED THEREON

REFERENCE TO RELATED APPLICATION

The present application claims priority from U.S. Provisional Patent Application No. 63/242,740 entitled "Pupil-Replicating Lightguide with Inside Coupler and VR Display Based Thereon", filed on Sep. 10, 2021 and incorporated herein by reference in its entirety.

TECHNICAL FIELD

The present disclosure relates to visual displays and their components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems, such s near-eye displays (NEDs), are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient display construction, including compact and efficient image projectors, lightguides, image forming optics, ocular lenses, etc.

BRIEF DESCRIPTION OF THE DRAWINGS

Exemplary embodiments will now be described in conjunction with the drawings, in which.

DETAILED DESCRIPTION

Figure 1A:
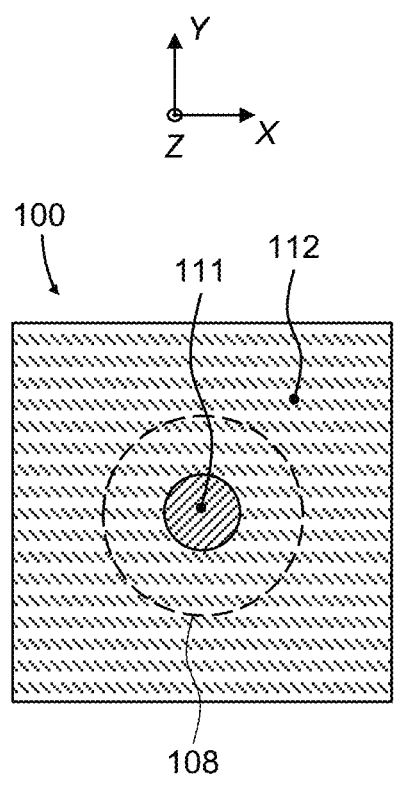
FIG. 1A is a plan view of a pupil-replicating lightguide of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A virtual reality (VR) display often uses a pair of miniature display panels viewed by a pair of ocular lenses, one display panel-lens combination per each eye. Such a display configuration, while providing a wide field of view, tends to be bulkier and heavier than display configurations based on miniature projectors projecting images in angular domain directly into the eyes. The latter, however, have a comparatively small exit pupil, necessitating a fixed position of the projector relative to the eye for the VR images to be observed, which may be inconvenient or impractical.

In accordance with this disclosure, a pupil-replicating lightguide may be used to provide multiple offset replicas of exit pupil of a projector, relaxing the requirement for eye position relative to the display module. In VR applications, the display user does not view outside environment, at least directly. Consequently, an in-coupler, e.g. an in-coupling grating, and an image projector may be placed in front of the user's eye, preferably at a center or close to a center of the pupil-replicating lightguide. The out-coupling/redirecting/beam splitting grating(s) of the lightguide may be placed around the in-coupling grating. In some embodiments, the out-coupling/redirecting/beam splitting grating(s) may completely surround the in-coupling grating on all sides. A configuration involving the in-coupler surrounded by an out-coupling region simplifies the lightguide construction and improves throughput of the lightguide.

In accordance with the present disclosure, there is provided a pupil-replicating lightguide comprising a slab of a transparent material for guiding light in the slab. The slab has length and width dimensions parallel to a slab plane, and a thickness dimension perpendicular to the slab plane. A first grating supported by the slab for in-coupling the light into the slab. A second grating is supported by the slab for at least one of: splitting the light in the slab, redirecting the light in the slab, or out-coupling the light from the slab. An orthogonal projection of the second grating onto the slab plane is disposed within an orthogonal projection of the slab onto the slab plane. An orthogonal projection of the first grating onto the slab plane is disposed within the orthogonal projection of the second grating onto the slab plane. The orthogonal projection of the first grating onto the slab plane may include a center of the orthogonal projection of the slab and/or a center of the orthogonal projection of the second grating onto the slab plane.

The slab may be characterized by first and second outer surfaces separated by a slab thickness along the thickness dimension. The first grating may disposed proximate the first surface of the slab, the second grating is disposed proximate the first surface or proximate the second surface of the slab. In embodiments where the second grating is disposed proximate the second surface, the pupil-replicating lightguide may further include a third grating supported by the slab proximate the first surface, for at least one of: splitting the light in the slab, redirecting the light in the slab, or out-coupling the light from the slab.

In embodiments where the second grating is configured to redirect the light in the slab, the pupil-replicating lightguide may further include a perimeter grating supported by the slab and disposed proximate a perimeter of the slab and configured to reflect the light redirected by the second grating back toward the second grating. An orthogonal projection of the perimeter grating onto the slab plane may surround the orthogonal projection of the second grating onto the slab plane. The second grating may be a 2D grating.

In accordance with the present disclosure, there is provided a near-eye display (NED) such as a virtual reality (VR) display, for example. The NED includes a pupil-replicating lightguide of this disclosure and a projector for providing the image light to the first grating of the pupil-replicating lightguide, the image light carrying an image in angular domain. The orthogonal projection of the first grating onto the slab plane may be disposed within a center area of the orthogonal projection of the slab onto the slab plane. In some embodiments, the center area is no greater than 50% of an area of the orthogonal projection of the slab onto the slab plane.

In operation, the pupil-replicating lightguide expands the image light in the slab plane and couples the image light expanded in the slab plane to an eyebox of the NED. The NED may further include an attenuator extending along the slab plane downstream of the first grating and upstream of the eyebox, for attenuating a portion of the image light propagated through the slab to the eyebox. The attenuator, e.g. a liquid crystal array, may be pre-configured to lessen a spatial variation of optical power density of the image light at the eyebox.

In accordance with the present disclosure, there is further provided a pupil-replicating lightguide comprising a slab of transparent material having parallel first and second outer surfaces and a center area; an in-coupling grating coupled to the center area of the slab for in-coupling image light having an angular distribution of a parameter into the center area of the slab to propagate in the slab by series of reflections from the first and second outer surfaces; and at least one out-coupling grating, e.g. a 2D grating, coupled to the slab for splitting, redirecting, and out-coupling the image light in-coupled into the slab by the in-coupling grating. The image light is out-coupled from the slab at locations around the in-coupling grating, while substantially preserving the angular distribution of the parameter of the out-coupled image light. The in-coupling grating and the at least one out-coupling grating may be coupled to at least one of the first or second outer surfaces of the slab.

In some embodiments, the center area of the slab is no greater than 50% of a total area of the slab. The pupil-replicating lightguide may further include a perimeter grating supported by the slab, disposed proximate a perimeter of the slab, and configured to reflect the light redirected by the out-coupling grating back toward the out-coupling grating.

Figure 1B:
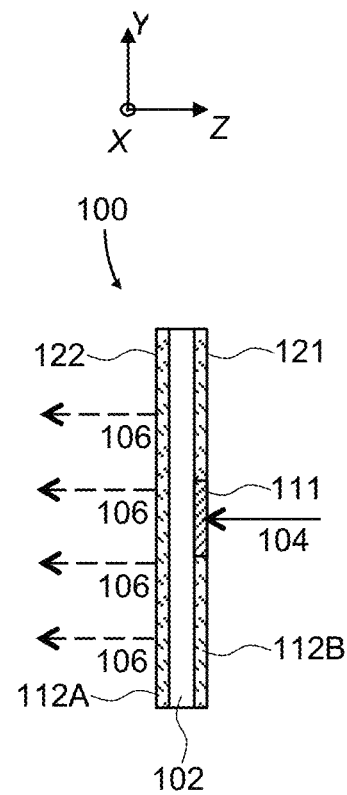
FIG. 1B is a side view of the pupil-replicating lightguide of FIG. 1A.

Referring now to FIGS. 1A and 1B, a pupil-replicating lightguide 100 includes a slab 102, e.g. a plano-parallel plate, of a transparent material such as glass, plastic, sapphire, titanium oxide, etc. The slab 102 has a length and a width dimensions parallel to the slab plane, i.e. XY plane of FIG. 1A, and a thickness dimension (slab thickness) perpendicular to the slab plane, i.e. along Z-axis in FIG. 1B.

A first, in-coupling grating 111 is disposed proximate a center of the slab 102, or within a center area 108 of the slab 102, for in-coupling image light 104 into the slab 102. The image light 104 may be provided by a projector, not shown in FIGS. 1A and 1B for brevity. A redirecting/out-coupling grating 112 is disposed around the in-coupling grating 111 for splitting and/or redirecting the image light 104 and/or out-coupling portions 106 of the light 104 from the slab 102. Herein, the term "disposed around" means that in a plan view of FIG. 1A representing an orthogonal projection of the pupil-replicating waveguide 100 onto the XY plane, the redirecting/out-coupling grating 112 surrounds the in-coupling grating 111 on all sides.

More than one redirecting/out-coupling grating 112 may be provided. For example, in FIG. 1B, two such gratings are shown, a second grating 112A at one side of the slab 102 and a third grating 112B at the other outer side, which is the same side as the in-coupling (first) grating 111. The second 112A and third 112B gratings are configured for splitting and/or redirecting and/or out-coupling of the image light 104. The image light 104 may carry an image in angular domain, i.e. a light beam where different ray angles of individual rays of the light beam correspond to different pixels of the image to be displayed, the ray intensity and/or color distribution corresponding to the pixel intensity and/or color distribution.

The slab 102 may include parallel first 121 and second 122 outer surfaces. The central area 108 of the slab 102 may include a geometrical center of a projection of the slab 102 onto the XY plane and may occupy up to 50%, 25%, or 10% of the total slab area in XY plane, as shown in FIG. 1A. The in-coupling (first) grating 111 may be coupled to the center area 108 at the first surface 121. The in-coupling (first) grating 111 and/or the redirecting/out-coupling grating(s) 112 may be disposed at any or both of the first 121 or second 122 outer surfaces, or may be within the slab 102.

The pupil-replicating lightguide 100 may be configured to carry and expand the image light 104 having an angular distribution of a parameter such as brightness, color, etc. To that end, the first grating 111 may in-couple the image light 104 into the center area 108 of the slab 102 to propagate in the slab 102 by series of reflections, e.g. total internal reflections, from the first 121 and second outer surfaces 122 of the slab 102. The second grating(s) 112 may be configured for at least one of splitting, redirecting, or out-coupling the image light 104 in-coupled into the slab 102 by the in-coupling (first) grating 111 to laterally expand, i.e. expand in XY plane, the image light 104 around the center area 108 of the slab 102, and to out-couple the portions 106 of the image light 104 from the slab 102 at a plurality of locations around the in-coupling (first) grating 111, while substantially preserving the angular distribution of the parameter of the image light 104. The second grating 112 may be a one-dimensional (1D) and/or two-dimensional (2D) grating including a 2D array of microstructures that diffract light. The details of the first grating 111 and out-coupling by the second grating(s) 112 embodiments will be provided further below.

Figure 2:
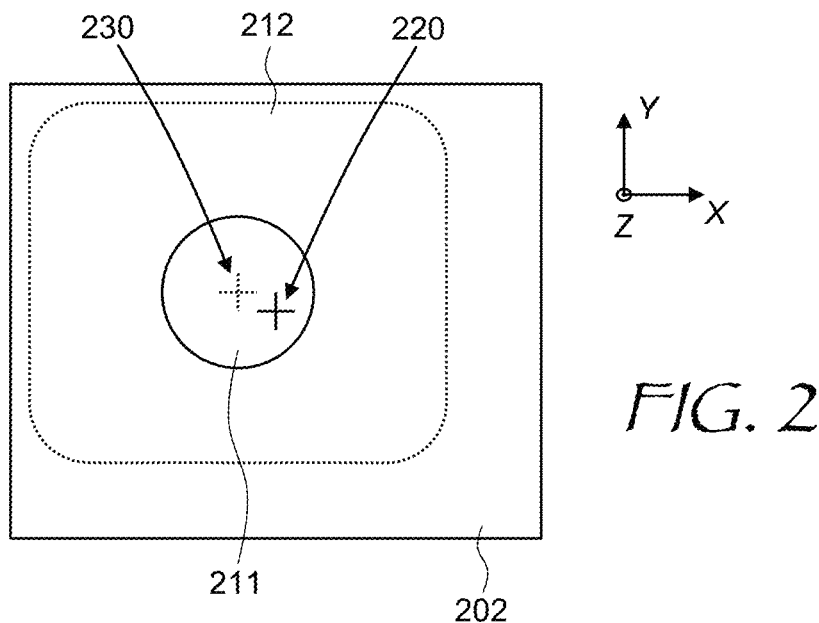
FIG. 2 is a schematic plan view of orthogonal projections of in- and out-coupling gratings onto a plane of the pupil-replicating lightguide of FIGS. 1A and 1B.

FIG. 2 illustrates possible in-coupling (first) grating 111 and out-coupling (second 112A and/or third 112B) grating(s) dispositions in the pupil-replicating lightguide 100. In FIG. 2, the gratings 111, 112A, and 112B are orthogonally projected onto the XY plane, i.e. the plane of FIG. 2 and the plane of the slab 102. In some embodiments, an orthogonal projection 212 of the second grating 112 onto the slab plane, i.e. XY plane, may be disposed within an orthogonal projection 202 of the slab 102 onto the slab plane. An orthogonal projection 211 of the in-coupling grating 111 onto the slab plane may be disposed within the orthogonal projection 212 of redirecting/out-coupling grating(s) 112 (i.e. the second 112A and/or third 112B gratings) onto the slab plane. The orthogonal projection 211 of the first grating 111 onto the slab plane may include a center 220 of the orthogonal projection 202 of the slab 102 onto the slab plane, i.e. a footprint of the slab 102. Also in some embodiments, the orthogonal projection 211 of the first grating 111 onto the slab plane may include a center 230 of the orthogonal projection 212 of the second grating(s) 112 onto the slab plane.

Figure 3:
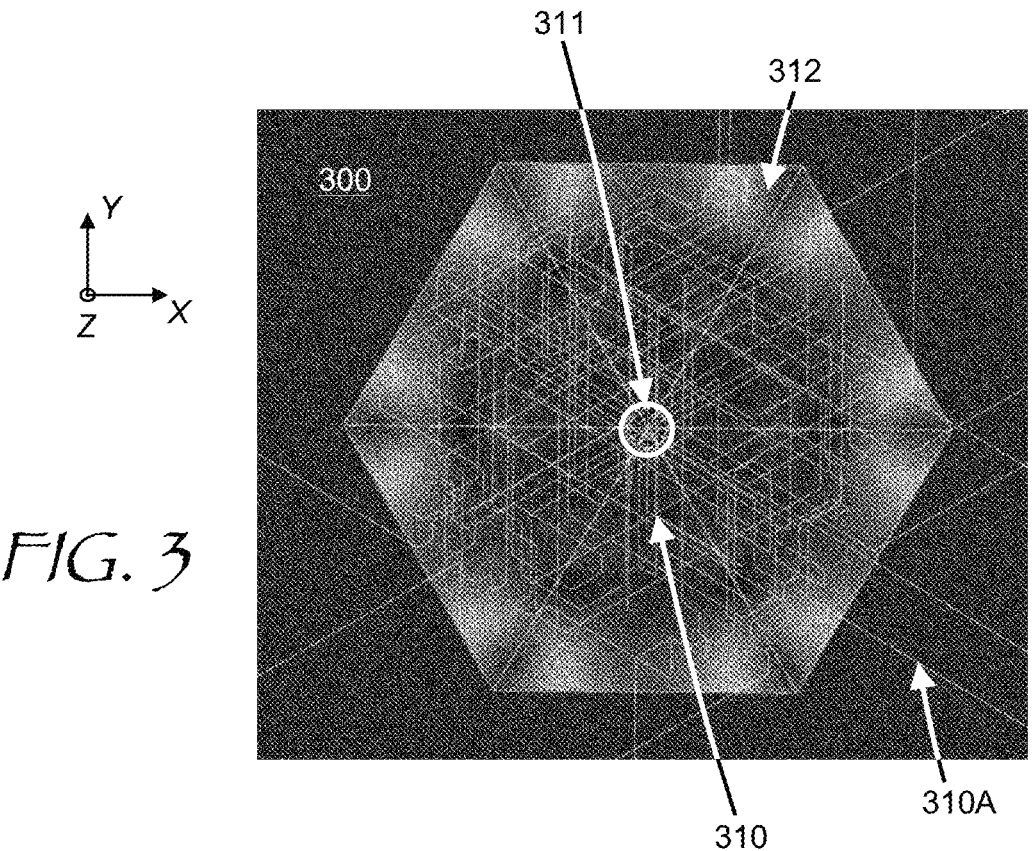
FIG. 3 is a plan view of a hexagonal pupil-replicating lightguide of this disclosure, showing traced rays of an in-coupled light beam.

FIG. 3 shows results of a simulation of ray propagation in a hexagonal pupil-replicating lightguide 300, which is similar to the pupil-replicating lightguide 100 of FIGS. 1A and 1B. The hexagonal pupil-replicating lightguide 300 of FIG. 3 includes an in-coupling grating 311 surrounded by a hexagonal out-coupling grating 312. Rays 310, shown as white lines on a dark background, propagate and get distributed all around the in-coupling grating 311, with some of the rays 310 (illustrated at 310A) exiting the hexagonal pupil-replicating lightguide 300 on sides. The hexagonal pupil-replicating lightguide 300 utilizes 2D gratings including a 2D array of dots or other shapes in XY plane, although a combination of 1D gratings, including an array of grating lines or fringes, may also be used.

Figure 4A:
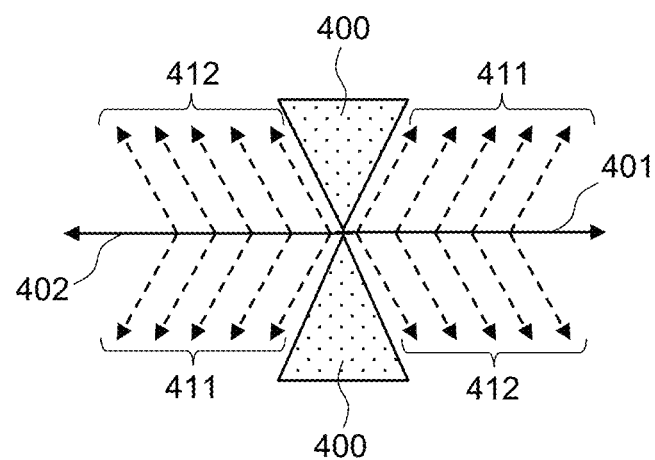
FIG. 4A is a k-vector diagram illustrating the appearance of a "blind zone" that may form in an image conveyed by a pupil-replicating lightguide of FIGS. 1A and 1B.

FIG. 4A shows a k-vector diagram for an embodiment of a pupil-replicating lightguide of this disclosure using a plurality of 1D redirecting gratings. A beam of light is injected into the pupil-replicating lightguide. The beam is diffracted by the in-coupling 1D grating to propagate inside the pupil-replicating lightguide as indicated by in-coupling k-vectors 401, 402. The diffracted beam propagates in directions corresponding to different diffraction orders, to the left and to the right as illustrated in FIG. 4A. The redirecting/out-coupling 1D gratings diffract the beams into two sub-beam groups as indicated by redirecting vectors 411, 412 pointing diagonally in FIG. 4A. The redirecting vectors 401, 402 may correspond to differently oriented 1D redirecting/out-coupling diffraction gratings. In this configuration, blind zones 400 may appear in the field of view. A user's eye will not see any images at portions of field of view corresponding to the blind zones 400.

Figure 4B:
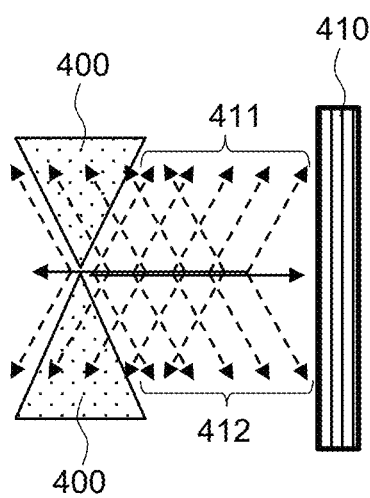
FIG. 4B is a schematic diagram illustrating the mitigation of the "blind zone" problem by using a back-reflecting grating.

One solution to the problem of blind zones of FIG. 4A is depicted in FIG. 4B, where a mirror 410 is disposed to reverse the in-coupling k-vector 401 and the redirecting vectors 411, 412 to effectively fill the blind zones 400 as illustrated. The mirror 410 may be implemented as a diffraction grating supported by the transparent slab. To reflect the rays back, a k-vector of the reflecting diffraction grating may be twice as long as the in-coupling 1D grating k-vectors 401, 402. For this to be achieved, the pitch of the reflecting grating may be twice as small as the pitch of the in-coupling 1D grating k-vectors 401, 402.

Figure 5:
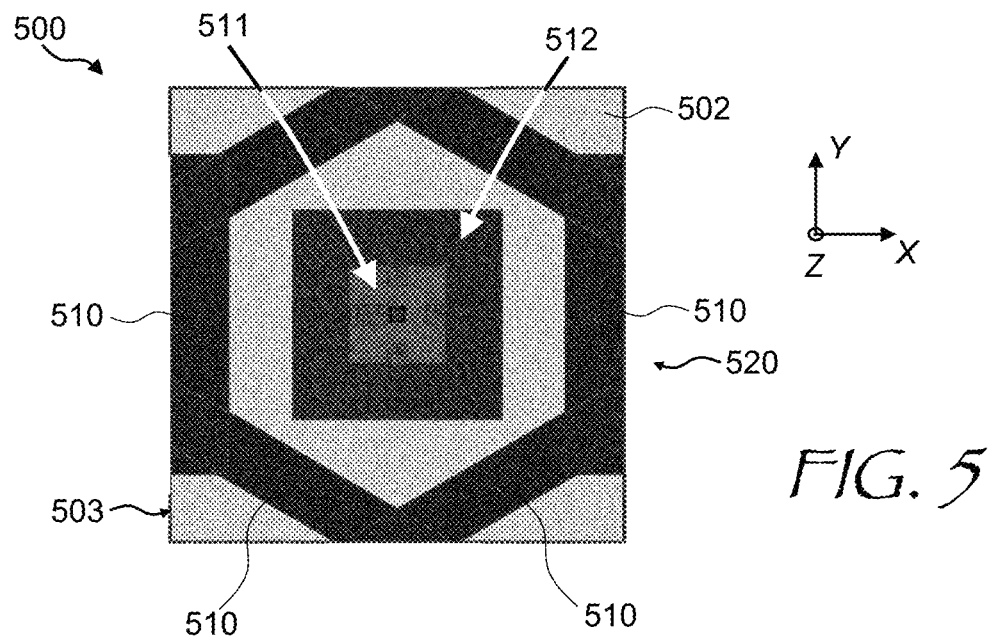
FIG. 5 is a plan schematic view of an embodiment of the pupil-replicating lightguide of FIGS. 1A and 1B including a hexagon of back-reflecting gratings.

Referring now to FIG. 5, a pupil-replicating lightguide 500 is an example implementation of the pupil-replicating lightguide 100 of FIGS. 1A and 1B. The pupil-replicating lightguide 500 of FIG. 5 includes an in-coupling 1D grating 511 and a pair of splitting/redirecting/out-coupling gratings 512. All the gratings 511 and 512 are supported by a slab 502 of transparent material in which the image light propagates. The splitting/redirecting/out-coupling gratings 512 surround the first grating 511 in the plan view of FIG. 5, i.e. in XY plane orthogonal projection. The grooves or fringes of the first, second, and third gratings form angles of 60 degrees w.r.t. each other in this embodiment.

To eliminate dead zones from the field of view, the pupil-replicating lightguide 500 includes six reflecting gratings 510. The reflecting gratings 510 may form a symmetrical hexagonal perimeter grating 520. As indicated by its name, the perimeter grating 520 is supported by the slab 502 near a perimeter of the slab 502. An orthogonal projection of the perimeter grating 520 onto the slab plane (i.e. the XY plane in FIG. 5) surrounds the orthogonal projection of the redirecting/out-coupling gratings 512 onto the slab 502 plane. In other words, the reflecting gratings 510 are disposed proximate a perimeter 503 of the slab 502 and configured to reflect the light redirected by the second grating 512 back toward the second grating 512. The operation of reflecting gratings has been explained above with reference to FIG. 4.

Efficiency E of the pupil-replicating lightguide 500 of FIG. 5A may be estimated as $$E = C*R*D*A \quad (1),$$

where C is a in coupling coefficient of the in-coupling grating 511, R is a reflectivity coefficient of the redirecting/out-coupling gratings 512, D is directionality of the gratings, and A is an aiming coefficient, i.e. the percentage of out-coupled light that reaches the eyebox. A worst-case aiming coefficient A may be estimated as $$A = \frac{EyeboxArea}{GratingArea} = \frac{W^2}{(W + 2L\tan(FOV/2))^2}, \quad (2)$$

where FOV is field of view, L is an eye relief distance, W is an eyebox width. For example, for the FOV=50 degrees, L=18 mm, W=15 mm one gets A=22%. Together with the estimation of the coupling coefficient C=40%, reflectivity coefficient R=90%, the directionality D=50%, the worst-case efficiency E is close to 4%.

Figure 6A:
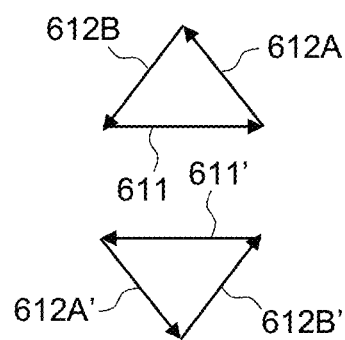
FIG. 6A is a k-vector diagram illustrating operation of the input gratings and output/redirecting gratings of the pupil-replicating lightguide of FIG. 5.

A k-vector diagram of FIG. 6A illustrates the operation of the in-coupling grating 511 and out-coupling/redirecting gratings 512 of the pupil-replicating lightguide 500. The in-coupling grating 511 diffracts an impinging beam of image light as represented by an in-coupling k-vector 611. The redirecting/out-coupling gratings 512 diffract the in-coupled ray of image light as illustrated by a redirecting k-vector 612A and an out-coupling k-vector 612B. Laterally offset portions of the beam are out-coupled from the slab 502 at a direction determined by an angle of incidence of the beam of the image light onto the in-coupling grating 511. Such a configuration of the in-coupling 511 and redirecting/out-coupling 512 gratings preserves the angular distribution of the impinging image light, while extending the image light over an eyebox of a display device.

Figure 6B:
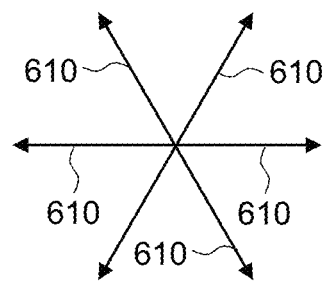
FIG. 6B is a -vector diagram illustrating operation of the reflection gratings of the pupil-replicating lightguide of FIG. 5.

The function of the reflecting gratings 510 is further illustrated with a k-vector diagram of FIG. 6B, which shows six reflecting k-vectors 610 corresponding to the six reflecting gratings 510. The reflecting k-vectors 610 represent the reflection of the image light beam back such that the in-coupling k-vector 611 becomes a reflected k-vector 611'. To that end, the pitch of the reflecting gratings 510 may be equal to one half of the pitch of the in-coupling grating 511 and the redirecting/out-coupling gratings 512. The reflected rays represented by the reflected k-vector 611' diffract again on the redirecting/out-coupling gratings 512, as represented a by reflected redirecting k-vector 612A' and a reflected out-coupling k-vector 612B' in the bottom part of FIG. 6A.

Figure 7:
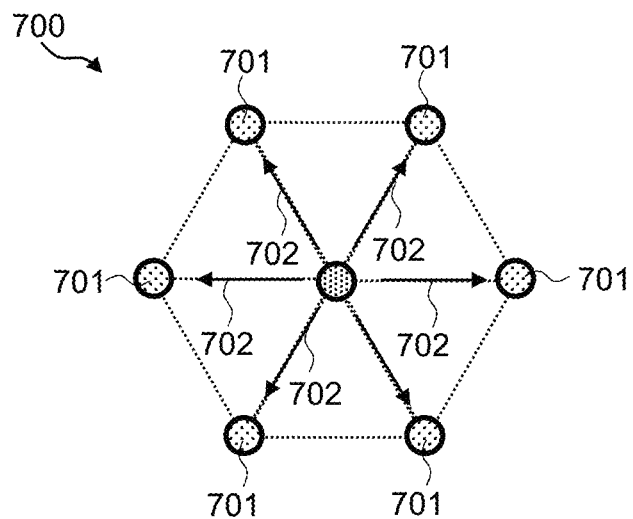
FIG. 7 is a plan view of a 2D grating usable as an in-coupling/out-coupling grating in the pupil-replicating lightguide of FIGS. 1A and 1B.

FIG. 7 shows a possible implementation of an in-coupling and/or out-coupling grating for a pupil-replicating lightguide of this disclosure. A grating 700 of FIG. 7 is a 2D grating; in other words, the grating 700 includes a 2D array of features 701 that diffract impinging light. One advantage of 2D gratings is that they generally do not cause blind zones discussed above with reference to FIG. 4A. The 2D gratings may be implemented as non-blazed binary gratings with equal diffraction efficiency in two opposite directions. The directions of diffraction of an impinging light beam are illustrated in FIG. 7 with arrows 702.

Figure 8:
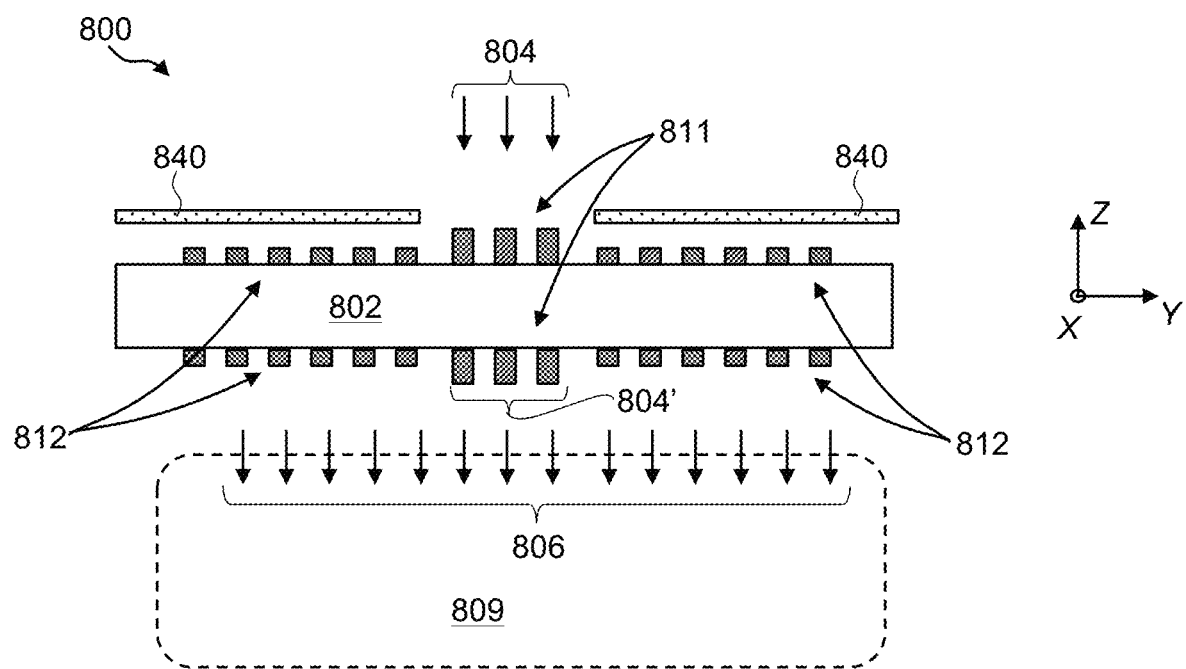
FIG. 8 is a side cross-sectional view of a pupil-replicating lightguide with binary 2D in-coupling and out-coupling gratings.

FIG. 8 depicts an example implementation of a pupil-replicating lightguide 800 based on binary 2D gratings. The pupil-replicating lightguide 800 includes 2D binary in-coupling gratings 811 and redirecting/out-coupling gratings 812 supported by a slab 802 of a transparent material such as glass, plastic, a high-index crystalline material, etc. The 2D binary in-coupling gratings 811 and redirecting/out-coupling gratings 812 are similar to the binary 2D grating 700 of FIG. 7. An optional mirror 840 may be provided for improving optical throughput of the pupil-replicating lightguide 800.

In operation, a beam 804 of image light impinges onto the top in-coupling grating 811 and is diffracted by the top in-coupling grating 811 to propagate in a slab 802 by total internal reflection. The redirecting/out-coupling gratings 812 out-couple laterally offset portions 806 of the beam 804 from the slab 802. A portion 804' of the beam 804 propagates straight through the slab 802. The pupil-replicating lightguide 800 expands the beam 804 of image light over an eyebox 809 while preserving angular distribution of optical power/color composition of the beam 804 representing an image in angular domain conveyed to the eyebox 809.

Figure 9:
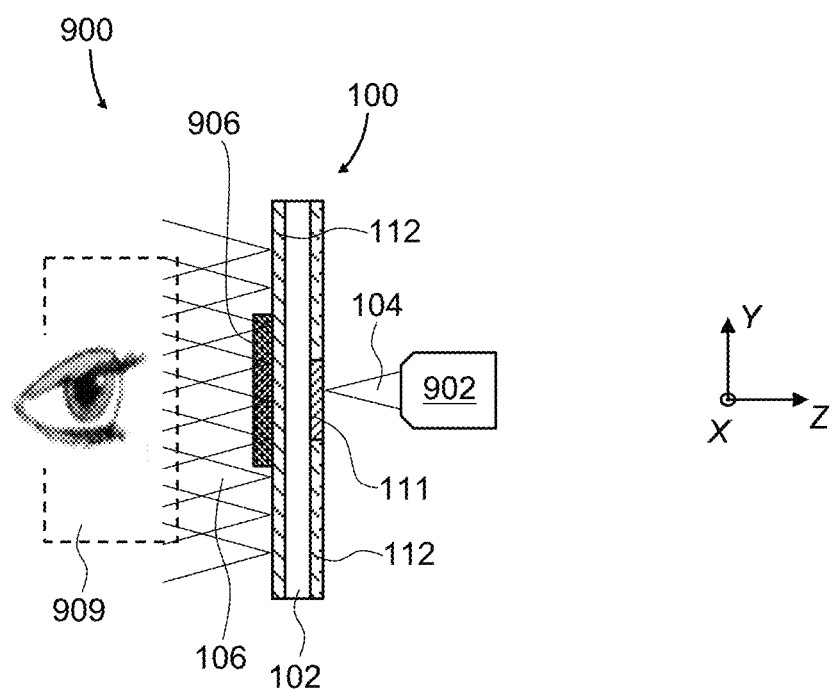
FIG. 9 is a side cross-sectional view of a VR display using the waveguide of FIGS. 1A and 1B.

Turning now to FIG. 9, a near-eye display (NED) 900, e.g. a virtual reality (VR) display, includes the pupil-replicating lightguide 100 of FIGS. 1A and 1B, or any other pupil-replicating lightguide disclosed herein, such as the pupil-replicating lightguide 300 of FIG. 3, the pupil-replicating lightguide 500 of FIG. 5, and/or the pupil-replicating lightguide 800 of FIG. 8, for example. The NED 900 includes a projector 902 for providing the image light 104 to the first grating 111 of the pupil-replicating lightguide 100, the image light 104 carrying an image in angular domain. The projector 902 may include a scanning projector or a microdisplay-based projector, for example.

In operation, the pupil-replicating lightguide 100 provides multiple offset portions 106 of the image light 104 illuminating an eyebox 909 of the NED 900. The projector 902 may be disposed to illuminate the center of the pupil-replicating lightguide 100 where the first grating 111 is located. Since a significant portion of the image light 104 may propagate through the pupil-replicating lightguide 100 without being in-coupled into the pupil-replicating lightguide 100, the optical power density of the image light portions 106 proximate the center of the pupil-replicating lightguide 100 may be far greater than at periphery of the pupil-replicating lightguide 100.

To even out this non-uniform optical power density distribution, the NED 900 may further include an attenuator 906 behind the first grating 111, for attenuating a portion of the image light 104 propagated through the first grating 111. The attenuator may be spatially non-uniform and/or may be tunable in attenuation. For example, a liquid crystal (LC) array may be used as such an attenuator. The LC array may be pre-calibrated or pre-configured to lessen a spatial variation of optical power density of the image light 114 at the factory to provide even illumination of the eyebox 909 with the image light portions 106.

Figure 10:
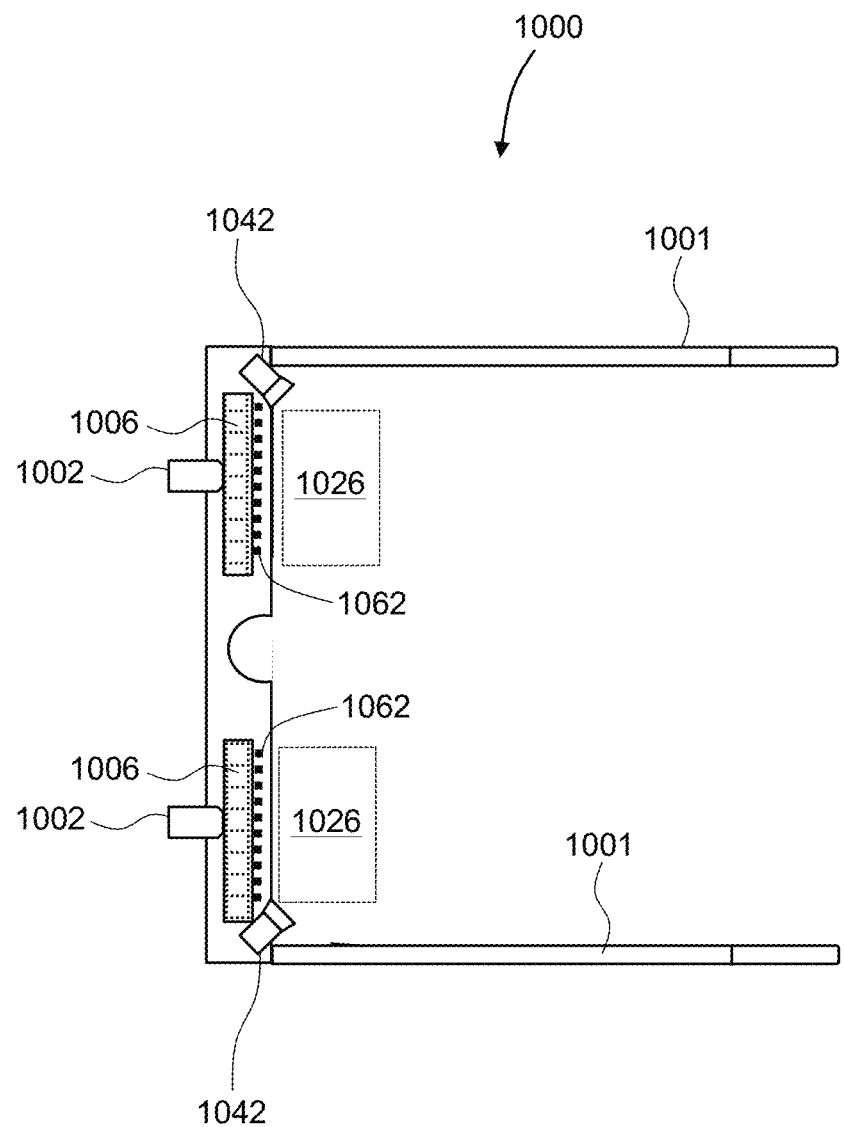
FIG. 10 is a view of an augmented reality (AR) display of this disclosure having a form factor of a pair of eyeglasses.

Turning to FIG. 10, a virtual reality (VR) near-eye display 1000 includes a frame 1001 supporting, for each eye: a projector 1002; a pupil-replicating lightguide 1006 operably coupled to the projector 1002 and including any of the pupil-replicating lightguides disclosed herein; and optionally a plurality of eyebox illuminators 1062, shown as black dots, placed onto the side of the pupil-replicating lightguide 1006 that faces the eyebox 1026. An eye-tracking camera 1042 may be provided for each eyebox 1026.

The purpose of the eye-tracking cameras 1042 is to determine position and/or orientation of both eyes of the user. The eyebox illuminators 1062 illuminate the eyes at the corresponding eyeboxes 1026, allowing the eye-tracking cameras 1042 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1062, the latter may be made to emit light invisible to the user. For example, infrared light may be used to illuminate the eyeboxes 1026.

Figure 11:
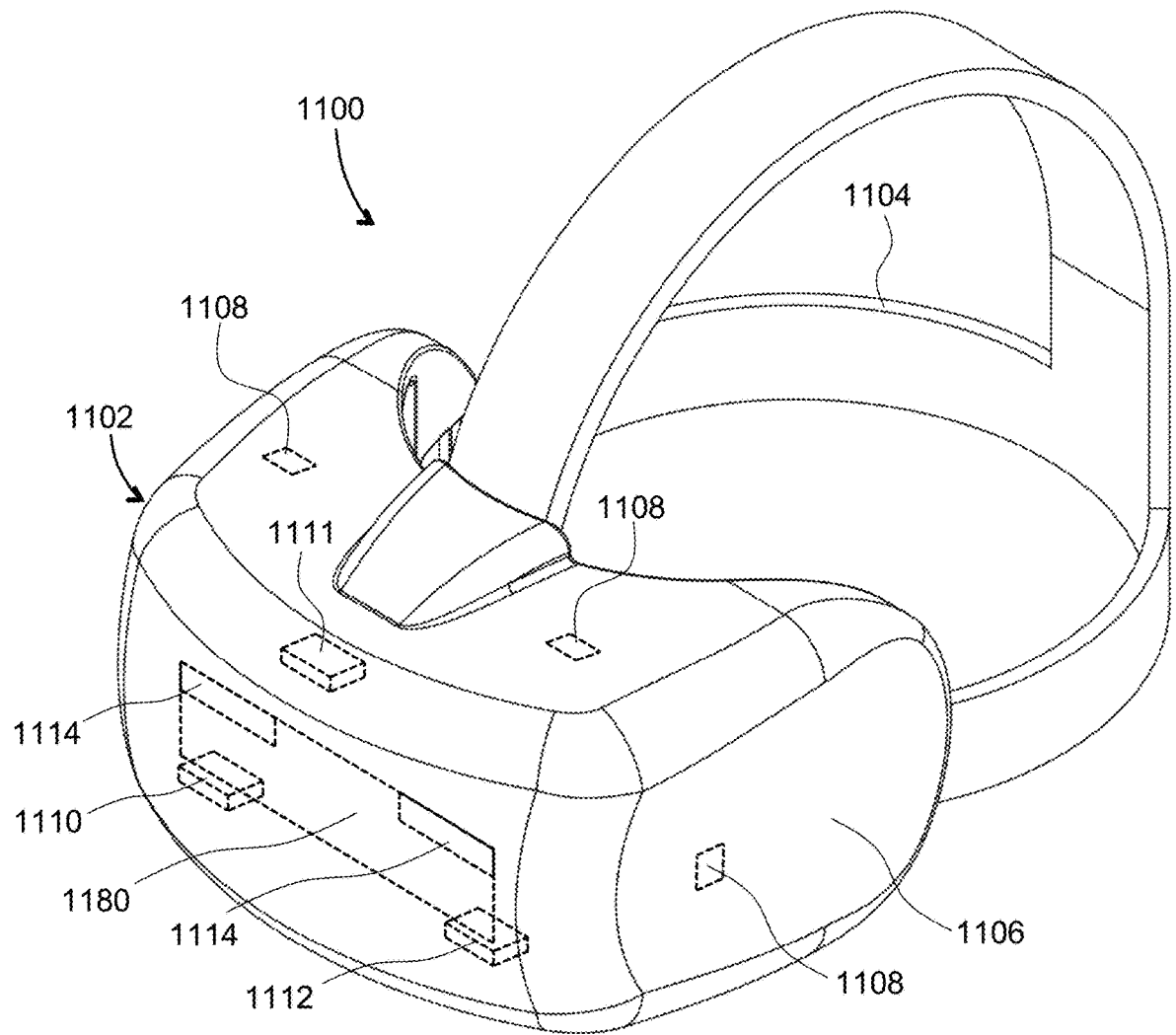
FIG. 11 is a three-dimensional view of a head-mounted display (HMD) of this disclosure.

Referring now to FIG. 11, an HMD 1100 is an example of an AR/VR wearable display system which encloses the user's face, for a greater degree of immersion into the AR/VR environment. The HMD 1100 may generate the entirely virtual 3D imagery. The HMD 1100 may include a front body 1102 and a band 1104 that can be secured around the user's head. The front body 1102 is configured for placement in front of eyes of a user in a reliable and comfortable manner. A display system 1180 may be disposed in the front body 1102 for presenting AR/VR imagery to the user. The display system 1180 may include any of the display devices disclosed herein. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. The determined gaze direction and vergence angle may be used to adjust the display system 1180 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pupil-replicating lightguide comprising:
a slab of a transparent material for guiding light therein, the slab having length and width dimensions parallel to a slab plane, and a thickness dimension perpendicular to the slab plane;
a first grating supported by the slab for in-coupling the light into the slab; and
a second grating supported by the slab for redirecting the light in the slab;
wherein:
a perimeter grating is supported by the slab and disposed proximate to a perimeter of the slab, such that the perimeter grating is configured to reflect the light redirected by the second grating back toward the second grating; and
an orthogonal projection of the perimeter grating onto the slab plane surrounds the orthogonal projection of the second grating onto the slab plane.

2. The pupil-replicating lightguide of claim 1, wherein the orthogonal projection of the first grating onto the slab plane includes a center of the orthogonal projection of the slab onto the slab plane.

3. The pupil-replicating lightguide of claim 1, wherein the orthogonal projection of the first grating onto the slab plane includes a center of the orthogonal projection of the second grating onto the slab plane.

4. The pupil-replicating lightguide of claim 1, wherein:
the slab comprises first and second outer surfaces separated by a slab thickness along the thickness dimension;
the first grating is disposed proximate the first surface; and
the second grating is disposed proximate the first surface.

5. The pupil-replicating lightguide of claim 1, wherein:
the slab comprises first and second outer surfaces separated by a slab thickness along the thickness dimension;
the first grating is disposed proximate the first surface;
the second grating is disposed proximate the second surface; and
the pupil-replicating lightguide further comprising a third grating supported by the slab proximate the first surface thereof, for at least one of: splitting the light in the slab; redirecting the light in the slab; or out-coupling the light from the slab.

6. The pupil-replicating lightguide of claim 1, wherein the second grating is a 2D grating.

7. A near-eye display (NED) comprising:
a pupil-replicating lightguide comprising:
a slab of transparent material for guiding image light therein, the slab having length and width dimensions parallel to a slab plane, and a thickness dimension perpendicular to the slab plane;
a first grating supported by the slab for in-coupling the image light into the slab; and
a second grating supported by the slab for redirecting the image light in the slab;
wherein:
a perimeter grating is supported by the slab and disposed proximate to a perimeter of the slab, such that the perimeter grating is configured to reflect the light redirected by the second grating back toward the second grating; and
an orthogonal projection of the perimeter grating onto the slab plane surrounds the orthogonal projection of the second grating onto the slab plane
the NED further comprising a projector for providing the image light to the first grating of the pupil-replicating lightguide, the image light carrying an image in angular domain.

8. The NED of claim 7, wherein the orthogonal projection of the first grating onto the slab plane is disposed within a center area of the orthogonal projection of the slab onto the slab plane, wherein the center area is no greater than 50% of an area of the orthogonal projection of the slab onto the slab plane.

9. The NED of claim 7, wherein the NED is a virtual reality (VR) display.

10. The NED of claim 7, wherein in operation, the pupil-replicating lightguide expands the image light in the slab plane and couples the image light expanded in the slab plane to an eyebox of the NED.

11. The NED of claim 10, further comprising an attenuator extending along the slab plane downstream of the first grating and upstream of the eyebox, for attenuating a portion of the image light propagated through the slab to the eyebox.

12. The NED of claim 11, wherein the attenuator is pre-configured to lessen a spatial variation of optical power density of the image light at the eyebox.

13. The NED of claim 11, wherein the attenuator comprises a liquid crystal array.

14. A pupil-replicating lightguide comprising:
a slab of transparent material having parallel first and second outer surfaces and a center area;
an in-coupling grating coupled to the center area of the slab for in-coupling image light having an angular distribution of a parameter into the center area of the slab to propagate in the slab by series of reflections from the first and second outer surfaces; and
at least one out-coupling grating coupled to the slab for redirecting the image light in-coupled into the slab by the in-coupling grating, wherein the image light is out-coupled from the slab at locations around the in-coupling grating while substantially preserving the angular distribution of the parameter of the out-coupled image light, wherein:
a perimeter grating is supported by the slab, disposed proximate to a perimeter of the slab, and configured to reflect the light redirected by the out-coupling grating back toward the out-coupling grating.

15. The pupil-replicating lightguide of claim 14, wherein the at least one out-coupling grating comprises a 2D grating.

16. The pupil-replicating lightguide of claim 14, wherein the in-coupling grating and the at least one out-coupling grating are coupled to at least one of the first or second outer surfaces of the slab.

17. The pupil-replicating lightguide of claim 14, wherein the center area of the slab is no greater than 50% of a total area of the slab.

18. The pupil-replicating lightguide of claim 1, wherein the first grating is configured to laterally expand the light from around a center of the slab such that the second grating out-couples portions of the light from the slab at locations around the first grating.

19. The pupil-replicating lightguide of claim 18, wherein the first grating is configured to laterally expand the light while substantially preserving an angular distribution of a parameter of the light.

20. The pupil-replicating lightguide of claim 14, further comprising at least six reflective gratings that are configured to form the perimeter grating in a shape of a symmetrical hexagon.

* * * * *